United States Patent
Wang et al.

(10) Patent No.: US 11,964,337 B2
(45) Date of Patent: Apr. 23, 2024

(54) NiTi ALLOY SURFACE CUTTING PROCESS AND ROUGHNESS ADJUSTMENT METHOD

(71) Applicant: SHANDONG UNIVERSITY, Shandong (CN)

(72) Inventors: Bing Wang, Shandong (CN); Zhanqiang Liu, Shandong (CN); Hong Wang, Shandong (CN); Jinfu Zhao, Shandong (CN); Qinghua Song, Shandong (CN); Yukui Cai, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 18/300,408

(22) Filed: Apr. 14, 2023

(65) Prior Publication Data

US 2023/0330762 A1    Oct. 19, 2023

(30) Foreign Application Priority Data

Apr. 14, 2022 (CN) .......................... 202210389096.X

(51) Int. Cl.
*B23D 79/00* (2006.01)
*C22C 19/00* (2006.01)
(Continued)

(52) U.S. Cl.
CPC ............ *B23D 79/00* (2013.01); *C22C 19/007* (2013.01); *C22F 1/10* (2013.01); *C25F 3/14* (2013.01)

(58) Field of Classification Search
CPC ........................... C25F 3/02–14; B23D 79/00
See application file for complete search history.

(56) References Cited

U.S. PATENT DOCUMENTS 4,386,971 A    6/1983  Melton et al.
2006/0271169 A1*  11/2006  Lye .................... A61L 31/146
                                                                 623/1.42

FOREIGN PATENT DOCUMENTS

CN    H0565599    3/1993
CN    103290247    9/2013
(Continued)

OTHER PUBLICATIONS

Kaynak, Yusuf, et al. "The effect of active phase of the work material on machining performance of a NiTi shape memory alloy." Metallurgical and Materials Transactions A 46 (2015): 2625-2636. (Year: 2015).*

(Continued)

*Primary Examiner* — Samir Shah
*Assistant Examiner* — Sean P. O'Keefe
(74) *Attorney, Agent, or Firm* — JCIPRNET

(57) ABSTRACT

The present disclosure relates to a NiTi alloy surface cutting process and a roughness adjustment method. Aiming at defects of difficult machining and unsatisfactory machining performance of Ni—Ti alloys, the present disclosure provides a surface cutting process of a difficult-to-machine nickel-titanium alloy, in which firstly, the nickel-titanium alloy is transformed from a two-phase state to a single-phase state using its transformation characteristic, and electro-chemical nickel removal treatment is carried out on a surface of the alloy in the single-phase state so as to obtain a porous surface layer, and then a surface material with the porous surface layer is cut. The method provided by the present disclosure can effectively reduce machining difficulty of alloy materials, and can also obtain alloy workpieces with adjustable roughness, which is of great significance for NiTi alloy machining.

10 Claims, 2 Drawing Sheets

(51) Int. Cl.
C22F 1/10 (2006.01)
C25F 3/14 (2006.01)

(56) References Cited

FOREIGN PATENT DOCUMENTS

| CN | 104630730 | 5/2015 |
| CN | 106404656 | 2/2017 |
| CN | 108581057 | 9/2018 |
| CN | 108788644 | 11/2018 |
| CN | 112239842 | 1/2021 |
| EP | 0543353 | 5/1993 |

OTHER PUBLICATIONS

Zang, Dongmian, et al. "Interfacial engineering of hierarchically porous NiTi/hydrogels nanocomposites with exceptional antibiofouling surfaces." Advanced Materials 29.2 (2017): 1602869 (Year: 2017).*

Shizuka, Hiroo, et al. "Difficult cutting property of NiTi alloy and its mechanism." Journal of Manufacturing and Materials Processing 4.4 (2020): 124. (Year: 2020).*

Yu Xueyong et al., " Effect of Ms Transformation Temperature on Anti-wear Behaviour of NiTi Shape Memory Alloys" , Lubrication Engineering, vol. 184, Issue 12, Dec. 2006, with English abstract, pp. 1-3.

\* cited by examiner

NiTi ALLOY SURFACE CUTTING PROCESS AND ROUGHNESS ADJUSTMENT METHOD

CROSS-REFERENCE TO RELATED APPLICATION

This application claims the priority benefit of China application serial no. 202210389096.X, filed on Apr. 14, 2022. The entirety of the above-mentioned patent application is hereby incorporated by reference herein and made a part of this specification.

BACKGROUND

Technical Field

The present disclosure belongs to the technical field of alloy surface cutting, and in particular relates to a NiTi alloy surface cutting process and a method for adjusting surface roughness of a NiTi alloy.

Description of Related Art

Disclosure of information in this background section is only intended to improve understanding of general background of the present disclosure, and is not necessarily taken as an admission or any form of suggestion that this information constitutes the prior art that is well known to those of ordinary skill in the art.

With development of high-end equipment, requirements for service performance and operation reliability of equipment materials and parts are constantly increased, which makes application of nickel-titanium alloy materials with excellent properties such as high strength and toughness and special functions increasingly extensive. However, material properties and machinability thereof are generally in a mutually exclusive relationship, and parts made of difficult-to-machine nickel-titanium alloy materials have been faced with technical problems such as low machining efficiency, poor machining surface quality and high manufacturing cost.

Machinability of difficult-to-machine alloy materials can be improved by indirect methods such as improving tool performance or optimizing cutting processes. In recent years, researches on improving the machinability of the difficult-to-machine alloy materials have been widely reported and many achievements have been made, including use of new cutting processes such as laser-assisted machining, low-temperature or minimum quantity lubrication machining, ultrasonic vibration-assisted machining and external electric field or magnetic field-assisted machining. However, implementation of the above indirect processes all depends on dedicated equipment, which results in increased production cost and has not yet reached ideal expectation.

In addition to the above indirect processes, internal factors such as chemical composition, crystal structure, intergranular inclusions or pores of the machined alloy materials may be changed (which may be referred to as a direct method), so that thermophysical and mechanical properties of the materials can be transformed. Machining processes in which properties of machined materials are changed by infiltrating elements into difficult-to-machine materials such as nickel and chromium alloy are proposed in patents CN108581057A and CN112239842A. With the direct method, material removal efficiency can be effectively improved, tool wear can be alleviated and cutting energy consumption can be reduced. However, the above element infiltration technology needs to adopt a heating furnace to heat and insulate the whole machined materials at a high temperature for a long time, which changes properties of a machined material matrix and affects normal use of the material.

Machinability of a difficult-to-machine nickel-titanium alloy can be improved by combining surface treatment technology with machining technology. Because the difficult-to-machine nickel-titanium alloy is composed of austenite and martensite at the room temperature, and structures and properties of the two phases are different, a uniform surface with good quality cannot be formed when surface treatment is carried out. However, the difficult-to-machine nickel-titanium alloys have good transformation characteristics, which can be transformed at different temperatures without affecting material properties. Therefore, transformation from a two-phase state to a single-phase state can be realized by changing the temperature, and the alloy can be surface-treated in the single-phase state.

SUMMARY

Based on the above background, surface treatment is designed and made on a NiTi alloy in the present disclosure so as to change machinability of the alloy and realize easier cutting without affecting performance of the alloy.

In order to achieve the above object, the present disclosure adopts following technical schemes.

The present disclosure provides a NiTi alloy surface cutting process, including: treating a NiTi alloy at a martensitic transformation temperature to obtain a martensitic single-phase NiTi alloy, removing Ni from the martensitic single-phase NiTi alloy in an electrochemical manner with the martensitic single-phase NiTi alloy as a working electrode so as to obtain a porous surface layer, and then cutting surface material with the porous surface layer.

According to Rehbinder effect, properties of the material surface play a decisive role in deformation behavior of the whole material. When a material surface is treated, surface energy can be reduced and dislocation migration of a lattice of the material surface layer can be caused, thus reducing strength and hardness of raw materials, and facilitating nucleation and propagation of microcracks on a solid surface. Therefore, it can be contemplated in the present disclosure that by treating a thin surface layer of a cut material, a loose and porous surface layer, that is, the porous surface layer, can be obtained, and this surface layer can play a role in inducing chip fracture. Meanwhile, loose and porous geometric defects can also reduce mechanical properties of the alloy (compared with bulk alloy), so that it is easier to be cut and be subjected to other surface machining, and it is proven in the present disclosure that an alloy surface obtained by firstly preparing the porous surface layer and then cutting has higher flatness and smoothness.

In order to construct this defective surface, a porous surface layer with a micro-nano structure is prepared on a surface of a NiTi alloy in an electrochemical method. Such a micro-nano porous surface layer has a complex three-dimensional structure with holes being communicated with each other, which makes it have a large specific surface area and good flow property. When a fluid flows through the holes (for example when machining is performed with cutting fluid or compressed air and other cooling media), the complex three-dimensional structure of the porous layer enhances disturbance to the fluid in the holes, facilitates heat exchange between a solid skeleton surface and the fluid, and meanwhile, the large specific surface area also makes the porous surface layer have a huge heat exchange area and high thermal conductivity, which is of great significance to heat dissipation of material machining.

Further, in order to obtain a more uniform and looser porous surface layer that can be precisely controlled, it is further designed in the present disclosure that the NiTi alloy is transformed into a martensitic single phase firstly. Martensite has many defects and great free energy and is easier to be corroded, and with electrochemical nickel removal treatment, surface treatment efficiency can be effectively improved so as to obtain a uniform and good quality surface.

In addition, in order to ensure above electrochemical treatment effect, the NiTi alloy should be placed in an electrochemical reaction solution, so that 70% or more of the NiTi alloy can be kept in a martensitic state. In addition, with the above preparation of the porous surface layer, the method according to the present disclosure can be used for adjusting surface roughness of the NiTi alloy, and technicians can adjust a cutting thickness according to requirement of roughness. For example, when the cutting thickness is less than a thickness of the porous surface layer, the cut workpiece is still maintained with a part of a surface of a porous structure, and an alloy material with improved roughness can be obtained, and a rough surface constructed based on the method according to the present disclosure has higher flatness.

Beneficial effects of one or more of the above technical schemes are as follows.
1. With the machining method provided by the present disclosure, the surface treatment of the alloy material can be realized without changing properties of the matrix nickel-titanium alloy material, with advantages of simple operation, no need of large auxiliary equipment and low cost.
2. In the present disclosure, a martensitic single-phase NiTi alloy is obtained by changing the temperature, and the alloy is subjected to surface nickel removal treatment in the single-phase state, so that a uniform surface with good quality can be obtained, and at the same time the surface treatment efficiency is improved.
3. In the present disclosure, the surface composition, structure and morphology of the difficult-to-machine nickel-titanium alloy material can be changed through the surface nickel removal method so as to form the porous surface layer. Properties of the treated surface layer of the alloy are weakened, and at the same time, it also plays a role in inducing chip fracture, which requires a small thickness of a surface treatment layer. In addition, the complex three-dimensional structure and large specific surface area of the porous surface layer make it have high thermal conductivity. This method can ensure machining accuracy and efficiency of parts, and at the same time, reduce tool loss and prolong tool life.

BRIEF DESCRIPTION OF THE DRAWINGS

Drawings of the specification, which constitute a part of the present disclosure, are used to provide further understanding of the present disclosure, and illustrative embodiments of the present disclosure and their descriptions are used to explain the present disclosure, and do not constitute undue limitations on the present disclosure.

DESCRIPTION OF THE EMBODIMENTS

Figure 1:
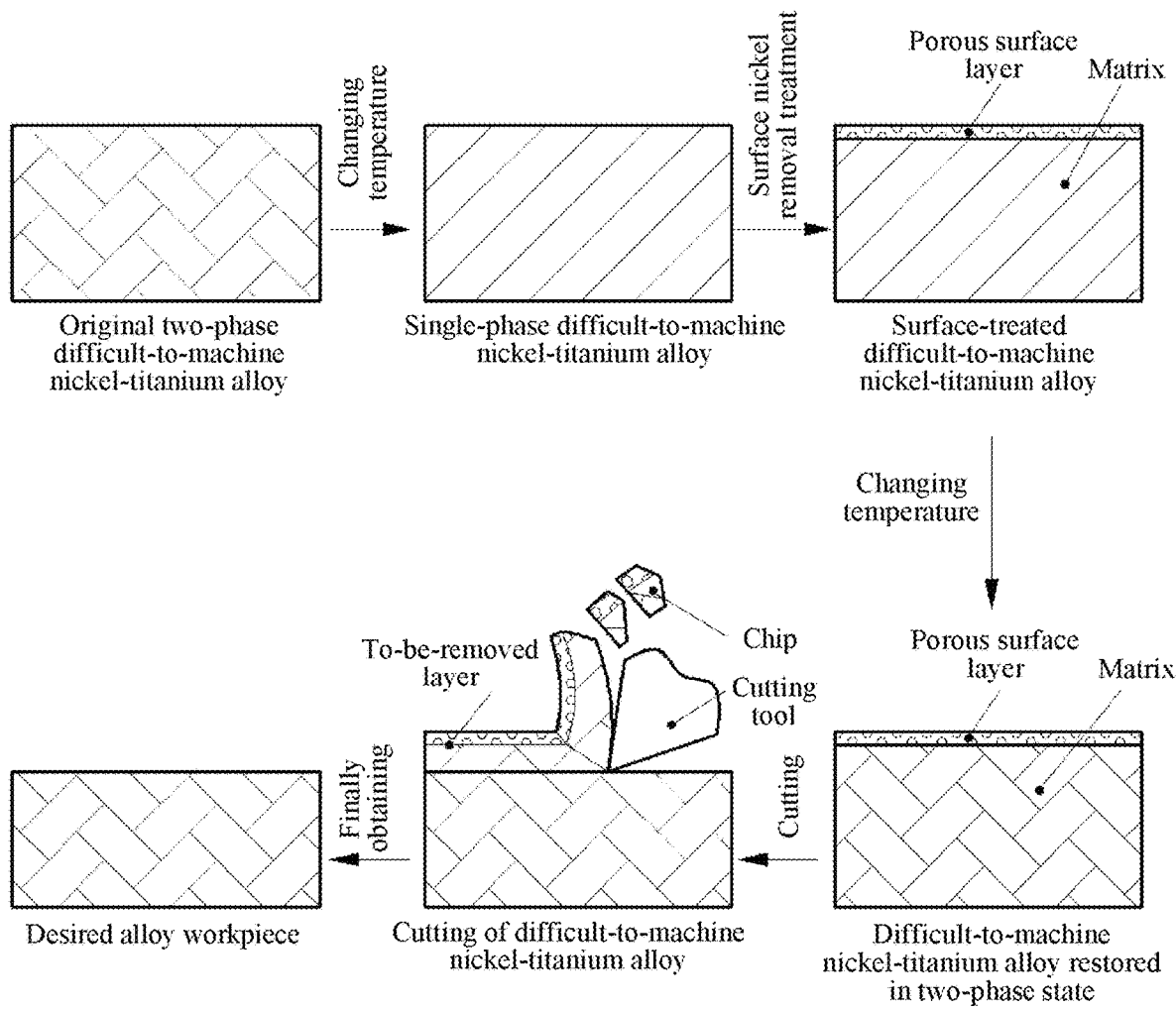
FIG. 1 is a schematic diagram of surface treatment auxiliary cutting process according to the present disclosure.

It should be noted that following detailed description is illustrative and is intended to provide further explanation of the present disclosure. Unless otherwise specified, all technical and scientific terms used herein have the same meaning as commonly understood by those of ordinary skill in the art to which the present disclosure belongs.

It should be noted that the terminology used herein is only for describing specific implementations, and is not intended to limit exemplary implementations according to the present disclosure. As used herein, a singular form is also intended to include a plural form unless the context clearly indicates otherwise. Furthermore, it should be understood that when the terms "including" and/or "comprising" are used in this specification, they specify presence of features, steps, operations, devices, components and/or combinations thereof.

As introduced in the background, parts made of difficult-to-machine nickel-titanium alloy materials have technical defects such as low machining efficiency, poor machining surface quality and high manufacturing cost. In order to solve shortcomings of the prior art, an object of the present disclosure is to provide a surface treatment auxiliary machining method for cutting a difficult-to-machine nickel-titanium alloy, which can realize high-efficiency, high-quality and high-precision machining of the difficult-to-machine nickel-titanium alloy material without affecting properties of a matrix material, and greatly reduce machining energy consumption and tool wear.

In a first aspect, the present disclosure provides a NiTi alloy surface cutting process, including: treating a NiTi alloy at a martensitic transformation temperature to obtain a martensitic single-phase NiTi alloy, removing Ni from the martensitic single-phase NiTi alloy in an electrochemical manner with the martensitic single-phase NiTi alloy as a working electrode so as to obtain a porous surface layer, and then cutting surface material with the porous surface layer. In the above cutting process, the NiTi alloy is further subjected to a pretreatment process before treatment: grinding, polishing and cleaning a surface to be cut.

Because a transformation temperature of the NiTi alloy is influenced by content of Ni element and other substances mixed in the alloy, transformation temperatures of different NiTi alloys are different. Technicians in the art may need to measure a transformation temperature of a NiTi alloy to be treated, using commonly used measurement methods such as in a thermal analysis method. For specific examples, relevant operations can refer to Pharmaceutical Industry Standard of the People's Republic of China, YYT0641_Standard test method for transformation temperature of nickel-titanium alloys by thermal analysis.

Preferably, a reaction solution for electrochemical removal of Ni is a $HNO_3$ solution with a mass fraction of 6% to 17% and reaction time of 1 h to 6 h. Further, an electrochemical reaction is carried out with a three-electrode electrochemical system, with the martensitic single-phase NiTi alloy as a working electrode, saturated calomel electrode as a reference electrode and a platinum sheet as an auxiliary electrode. In an implementation provided by the present disclosure, an applied potential of the electrochemical reaction is 1.7 V to 2 V, and the electrochemical reaction is carried out at an ambient martensitic transformation temperature for 0.5 h to 2 h.

The above electrochemical reaction time, type and concentration of the reaction solution are related to a thickness and a pore size of the porous surface layer on the alloy surface. In a specific implementation, the reaction solution is the $HNO_3$ solution with a mass fraction of 10% to 12%, an applied potential is 1.8 V to 1.85 V, reaction time is 1 h to 1.5 h, and a thickness of the porous surface layer is 2 μm to 5 μm. With extended reaction time, and increased solution concentration and applied potential, the porous surface layer become thicker, and the pore size become larger.

Preferably, the cutting includes, but is not limited to, removing the porous surface layer by turning or milling.

In a second aspect, the present disclosure provides a method for adjusting surface roughness of a NiTi alloy, which includes preparing a porous surface layer on a surface of the NiTi alloy by adopting the NiTi alloy surface cutting process according to the first aspect.

According to requirements of roughness adjustment, technicians can adjust the thickness of the porous surface layer on the NiTi alloy surface and the cutting thickness based on the above process. Specifically, in order to obtain an alloy surface with higher roughness, a cutting depth is less than a thickness of the porous surface layer; and in order to obtain a smooth alloy surface, the cutting depth should be equal to or greater than the thickness of the porous surface layer.

In order to make technicians in the art know the technical schemes of the present disclosure more clearly, the technical schemes of the present disclosure will be explained in detail in combination with specific embodiments.

Embodiment 1

A material used in this embodiment is the NiTi alloy, and a martensitic transformation starting temperature Ms and ending temperature Mf, and an austenitic transformation starting temperature As and ending temperature Af are 40.3° C., 15.4° C., 59° C. and 84.5° C. respectively.

With a machining requirement of a cutting depth of 10 μm, the thickness of the porous surface layer is controlled to be 2 μm to 3 μm.

Figure 2:
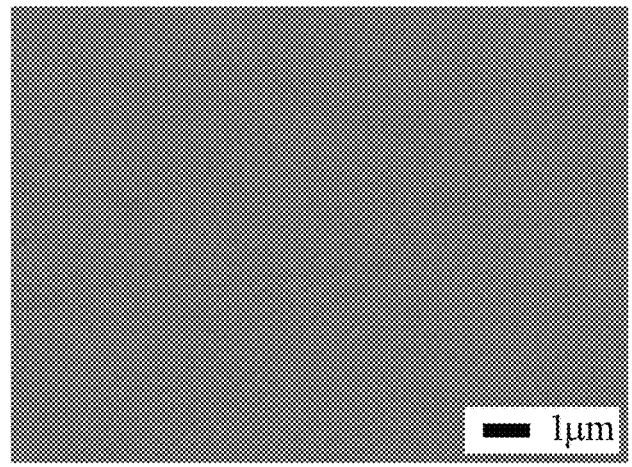
FIG. 2 shows original alloy surface morphology after pretreatment with a NiTi alloy as a sample material in Embodiment 1 of the present disclosure.
Figure 3:
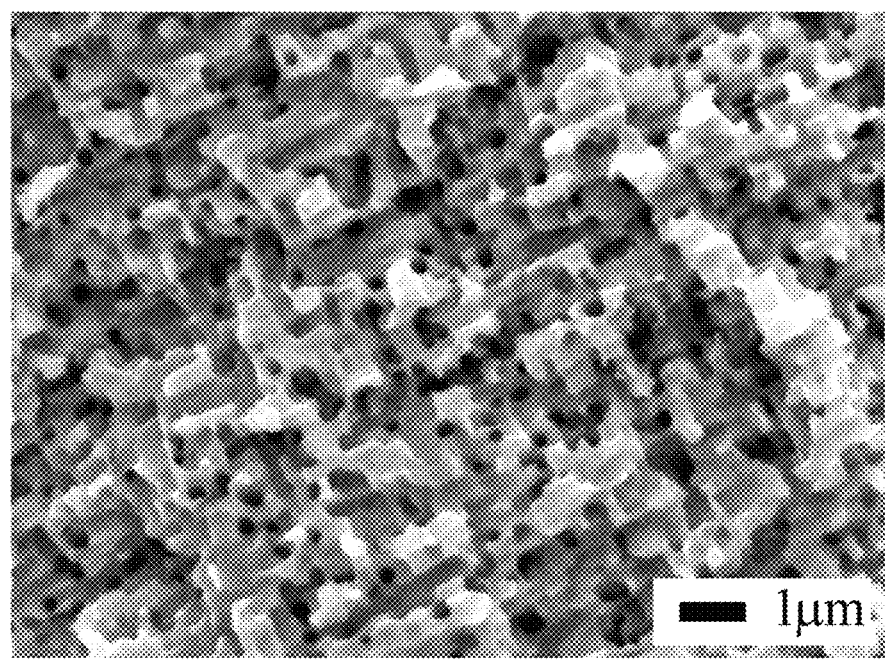
FIG. 3 shows surface morphology of a porous surface layer after surface treatment with a NiTi alloy as a sample material in Embodiment 1 of the present disclosure.

A method for preparing the porous surface layer includes:
(1) The NiTi alloy was cut into 10 mm×10 mm×5 mm samples, which is grinded, polished and cleaned for later use, and an original alloy surface of a sample material is shown in FIG. 2.
(2) The NiTi alloy sample was placed in an environment of 5° C., and kept in an environment lower than the martensitic transformation ending temperature for 0.5 h, so as to change the NiTi alloy sample from an austenitic and martensitic two-phase state to a martensitic single-phase state.
(3) The NiTi alloy sample was subjected to nickel removal treatment in a three-electrode electrochemical system, in which the NiTi alloy sample was used as the working electrode, saturated calomel electrode was used as a reference electrode, a platinum sheet was used as an auxiliary electrode, a reaction solution was a $HNO_3$ solution with a mass fraction of 10%, and an applied potential was 1.8 V, and the porous surface layer with a micro-nano structure was obtained after treatment in an environment of 5° C. for 1 h, and its surface morphology was shown in FIG. 3.
(4) After the surface treatment is completed, the NiTi alloy sample was cleaned with distilled water and placed in a room temperature environment to restore it to its original two-phase state.

Figure 4:
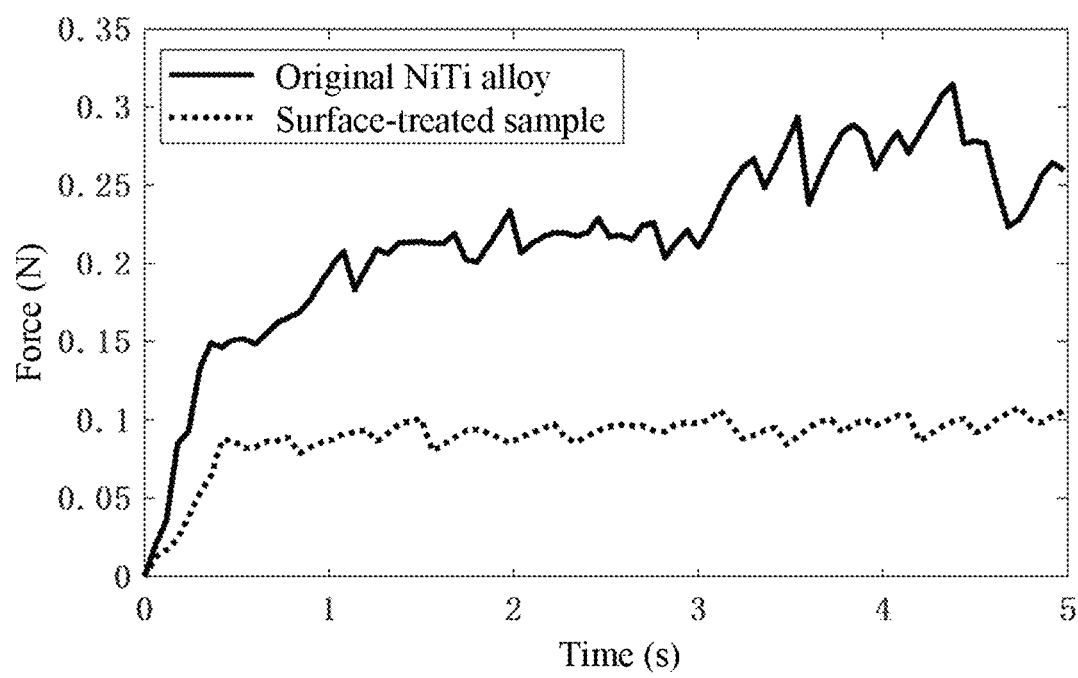
FIG. 4 is a comparison diagram of scratching forces of a NiTi alloy as a sample material before and after surface treatment in Embodiment 1 of the present disclosure.

Scratching test was carried out on the surface-treated samples, respectively on the original NiTi alloy and the surface-treated samples, respectively, with test conditions of a constant depth of 10 μm and a scratching speed of 1 mm/s. As can be seen from FIG. 4, compared with the original alloy material, a force used in scratching the surface-treated samples has obviously decreased, machinability has been improved, and machined surface roughness has been reduced by 10%.

Embodiment 2

In this embodiment, a process for cutting the NiTi alloy surface is provided, which is different from Embodiment 1 in that:
(1) The NiTi alloy was cut into 10 mm×10 mm×5 mm samples, which is grinded, polished and cleaned for later use.
(2) The NiTi alloy sample was placed at 15° C., and kept in an environment lower than the martensitic transformation ending temperature for 2 h, so as to change the NiTi alloy sample from an austenitic and martensitic two-phase state to a martensitic single-phase state.
(3) The NiTi alloy sample was subjected to nickel removal treatment in a three-electrode electrochemical system, in which the NiTi alloy sample was used as the working electrode, saturated calomel electrode was used as a reference electrode, a platinum sheet was used as an auxiliary electrode, a reaction solution was a $HNO_3$ solution with a mass fraction of 12%, and an applied potential was 2 V, and the porous surface layer with a micro-nano structure was obtained with a thickness of 5 μm to 10 μm after treatment in an environment of 15° C. for 3 h.
(4) After the surface treatment is completed, the NiTi alloy sample was cleaned with distilled water and placed in a room temperature environment to restore it to its original two-phase state.

Embodiment 3

In this embodiment, a method for adjusting surface roughness of a NiTi alloy is provided, which is different from Embodiment 1 in that:
(1) The NiTi alloy was cut into 10 mm×10 mm×5 mm samples, which is grinded, polished and cleaned for later use.
(2) The NiTi alloy sample was placed at 10° C., and kept in an environment lower than the martensitic transformation ending temperature for 1 h, so as to change the NiTi alloy sample from an austenitic and martensitic two-phase state to a martensitic single-phase state.
(3) The NiTi alloy sample was subjected to nickel removal treatment in a three-electrode electrochemical system, in which the NiTi alloy sample was used as the working electrode, saturated calomel electrode was used as a reference electrode, a platinum sheet was used as an auxiliary electrode, a reaction solution was a $HNO_3$ solution with a mass fraction of 11%, and an applied potential was 2 V, and the porous surface layer with a micro-nano structure was obtained after treatment in an environment of 10° C. for 2.5 h.

(4) After the surface treatment is completed, the NiTi alloy sample was cleaned with distilled water and placed in a room temperature environment to restore it to its original two-phase state. A thickness of the porous surface layer is 8 μm and the cutting thickness is 5 μm. After machining, surface roughness Ra of the NiTi alloy sample increases from 0.296 μm to 1.099 μm, while ensuring flatness of the sample surface in a cutting process.

The above is only specific embodiments of the present disclosure, and is not intended to limit the present disclosure, and modifications and variations can be made in the present disclosure for those skilled in the art. Any modification, equivalent substitution, improvement and the like made within the spirit and principle of the present disclosure shall be encompassed within the protection scope of the present disclosure.

What is claimed is:

1. A NiTi alloy surface cutting process, comprising: treating a NiTi alloy at a martensitic transformation temperature to obtain a martensitic single-phase NiTi alloy; removing Ni from the martensitic single-phase NiTi alloy in an electrochemical manner with the martensitic single-phase NiTi alloy as a working electrode so as to obtain a porous surface layer; cleaning, with a distilled water, and placing the martensitic single-phase NiTi alloy having the porous surface layer at the room temperature to restore the martensitic single-phase NiTi alloy to a two-phase state, and then cutting surface material with the porous surface layer.

2. The NiTi alloy surface cutting process according to claim 1, wherein in the cutting process, the NiTi alloy is further subjected to a pretreatment process before treatment: grinding, polishing and cleaning a surface to be cut.

3. The NiTi alloy surface cutting process according to claim 1, wherein the transformation temperature of the NiTi alloy is determined by a thermal analysis method.

4. The NiTi alloy surface cutting process according to claim 1, wherein a reaction solution for electrochemical removal of Ni is a $HNO_3$ solution with a mass fraction of 6% to 17% and reaction time of 1 h to 6 h.

5. The NiTi alloy surface cutting process according to claim 4, wherein the electrochemical reaction is carried out in a three-electrode electrochemical system, in which the martensitic single-phase NiTi alloy is used as a working electrode, saturated calomel electrode is used as a reference electrode, and a platinum sheet is used as an auxiliary electrode.

6. The NiTi alloy surface cutting process according to claim 4, wherein an applied potential of the electrochemical reaction is 1.7 V to 2 V, and treatment is carried out in a martensitic transformation environment for 0.5 h to 2 h.

7. The NiTi alloy surface cutting process according to claim 4, wherein the reaction solution is a $HNO_3$ solution with a mass fraction of 10% to 12%, an applied potential is 1.8 V to 1.85 V, reaction time is 1 h to 1.5 h, and a thickness of the porous surface layer is 2 μm to 5 μm.

8. The NiTi alloy surface cutting process according to claim 1, wherein the cutting comprises removing the porous surface layer by turning or milling.

9. A method for adjusting surface roughness of a NiTi alloy, comprising preparing a porous surface layer on a surface of the NiTi alloy by adopting the NiTi alloy surface cutting process according to claim 1.

10. The method for adjusting the surface roughness of a NiTi alloy according to claim 9, wherein in order to obtain an alloy surface with higher roughness, a cutting depth is less than the thickness of the porous surface layer; or in order to obtain a smooth alloy surface, the cutting depth is equal to or greater than the thickness of the porous surface layer.

* * * * *